United States Patent
Jalbout (10) Patent No.: US 11,014,808 B2
(45) Date of Patent: May 25, 2021

(54) SYSTEM FOR GENERATING H$_2$S IN AN ALKALINE MEDIUM AND METHOD OF USING THE SAME

(71) Applicant: METOXS PTE. LTD., Singapore (SG)

(72) Inventor: Abraham Fouad Jalbout, Tucson, AZ (US)

(73) Assignee: CLEAN RESOURCES PTE. LTD, Singapore (SG)

(*) Notice: Subject to any disclaimer, the term of this patent is extended or adjusted under 35 U.S.C. 154(b) by 30 days.

(21) Appl. No.: 16/066,527

(22) PCT Filed: Dec. 23, 2016

(86) PCT No.: PCT/IB2016/057992
§ 371 (c)(1),
(2) Date: Jun. 27, 2018

(87) PCT Pub. No.: WO2017/115260
PCT Pub. Date: Jul. 6, 2017

(65) Prior Publication Data
US 2019/0010049 A1 Jan. 10, 2019

Related U.S. Application Data

(60) Provisional application No. 62/271,263, filed on Dec. 27, 2015, provisional application No. 62/276,966, filed on Jan. 11, 2016.

(51) Int. Cl.
*C01B 3/04* (2006.01)
*C01B 17/16* (2006.01)
(Continued)

(52) U.S. Cl.
CPC .......... *C01B 3/04* (2013.01); *B01J 3/04* (2013.01); *B01J 7/02* (2013.01); *B01J 8/0005* (2013.01);
(Continued)

(58) Field of Classification Search
CPC ........ B01J 3/00; B01J 3/04; B01J 7/00; B01J 7/02; B01J 8/00; B01J 8/0005; B01J 8/18;
(Continued)

(56) References Cited

U.S. PATENT DOCUMENTS 1,862,900 A 6/1932 Lynn et al.
2,694,619 A 11/1954 Wilkins
(Continued)

FOREIGN PATENT DOCUMENTS

KR 1982-0001196 7/1982

OTHER PUBLICATIONS

Lin et al., "Reaction of sulfur with water under hydrothermal conditions", 2005, pp. 365-368.

*Primary Examiner* — Natasha E Young
(74) *Attorney, Agent, or Firm* — Blank Rome LLP (57) ABSTRACT

Method of producing hydrogen sulfide in an alkaline environment. A mixture having a sodium salt, elemental sulfur (S) and water is added to a reactor for the purpose of generating hydrogen sulfide (H$_2$S) gas as the main product and sodium sulfate (Na$_2$SO$_4$) as a byproduct.

26 Claims, 5 Drawing Sheets

(51) Int. Cl.
*C01D 5/00* (2006.01)
*B01J 3/04* (2006.01)
*B01J 7/02* (2006.01)
*B01J 8/20* (2006.01)
*B01J 19/00* (2006.01)
*B01J 19/06* (2006.01)
*B01J 19/18* (2006.01)
*B01J 8/00* (2006.01)

(52) U.S. Cl.
CPC ............. *B01J 8/20* (2013.01); *B01J 19/0013* (2013.01); *B01J 19/0066* (2013.01); *B01J 19/06* (2013.01); *B01J 19/1862* (2013.01); *C01B 17/161* (2013.01); *C01B 17/165* (2013.01); *C01D 5/00* (2013.01); *B01J 2208/0007* (2013.01); *B01J 2208/00141* (2013.01); *B01J 2208/00176* (2013.01); *B01J 2208/00212* (2013.01); *B01J 2208/00283* (2013.01); *B01J 2208/00592* (2013.01); *B01J 2219/00074* (2013.01)

(58) Field of Classification Search
CPC . B01J 8/20; B01J 19/00; B01J 19/0006; B01J 19/0013; B01J 19/0053; B01J 19/0066; B01J 19/06; B01J 19/18; B01J 19/1862; B01J 2208/00; B01J 2208/00008; B01J 2208/00017; B01J 2208/0007; B01J 2208/00106; B01J 2208/00141; B01J 2208/00168; B01J 2208/00176; B01J 2208/00212; B01J 2208/00283; B01J 2208/00592; B01J 2219/00; B01J 2219/00049; B01J 2219/00051; B01J 2219/00074; C01B 3/00; C01B 3/02; C01B 3/04; C01B 17/00; C01B 17/16; C01B 17/161; C01B 17/165; C01D 5/00

See application file for complete search history.

(56) References Cited

U.S. PATENT DOCUMENTS

| | | | |
|---|---|---|---|
| 2,705,187 | A | 3/1955 | Terziev |
| 2,876,070 | A * | 3/1959 | Roberts, Jr. ........... C01B 17/162 |
| | | | 423/563 |
| 3,909,422 | A | 9/1975 | Sample, Jr. |
| 4,141,961 | A | 2/1979 | Miller |
| 4,198,385 | A | 4/1980 | Feldbaumer et al. |
| 6,387,669 | B1 | 5/2002 | Truex et al. |
| 6,572,829 | B2 | 6/2003 | Linkous et al. |
| 2001/0025781 | A1 | 10/2001 | Linkous et al. |
| 2004/0115120 | A1 | 6/2004 | Buisman et al. |
| 2013/0149788 | A1 | 6/2013 | Sacks et al. |

* cited by examiner

SYSTEM FOR GENERATING H₂S IN AN ALKALINE MEDIUM AND METHOD OF USING THE SAME

CROSS-REFERENCE TO RELATED APPLICATIONS

This application is a U.S. National Stage Application of PCT/IB2016/057992, now WO2017/115260, filed Dec. 23, 2016, which claims priority to U.S. Provisional Application No. 62/271,263, filed Dec. 27, 2015 and U.S. Provisional Application No. 62/276,966, filed Jan. 11, 2016. The entire contents of those applications are incorporated herein by reference.

FIELD OF THE INVENTION

The present invention relates to a method of producing hydrogen sulfide gas in an alkaline medium.

BACKGROUND OF THE INVENTION

Hydrogen sulfide is a chemical compound with the formula $H_2S$. At room temperature, it is a colorless, flammable and extremely dangerous gas with the characteristic foul odor of rotten eggs. Chemically, hydrogen sulfide acts as a reducing agent, and reacts with metal ions to form metal sulfides, which may be considered the salts of hydrogen sulfide. In addition, the naturally occurring mineral form of several metals are sulfides (e.g., galena, or lead(II) sulfide and sphalerite, or zinc sulfide). In regards to health, hydrogen sulfide is both an irritant and a chemical asphyxiant which affects oxygen utilization and the central nervous system. At lower concentrations (2-5 ppm), it causes nausea, tearing of the eyes, headaches and/or loss of sleep. Moderate concentrations (5-100 ppm) can cause more severe eye and respiratory irritation. At higher concentrations, (100+ ppm) it can cause shock, convulsions, inability to breathe, extremely rapid unconsciousness, coma and death.

Figure 1:
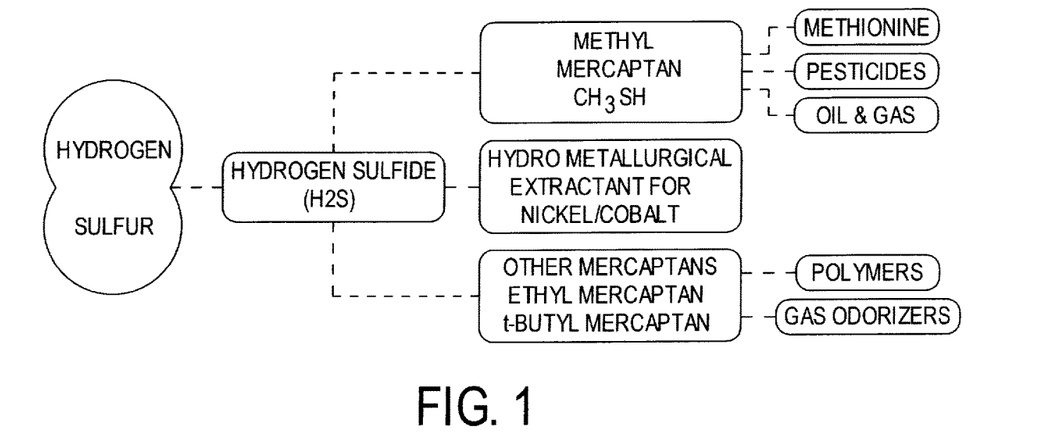
FIG. 1 is an illustration of advantageous industrial applications of hydrogen sulfide gas.

Despite the above health risks, hydrogen sulfide has a number of advantageous industrial applications as illustrated in FIG. 1. For example, it is used as an additive of petroleum products and as an analytical reagent in chemical analysis. It is also used to produce sulfur and sulfuric acid.

Historically, hydrogen sulfide was most commonly obtained by its separation from "sour gas," which is a natural gas with a high content of $H_2S$. In most modern industrial applications, hydrogen sulfide is produced by reacting hydrogen gas at high pressure (>10 bar) with molten elemental sulfur at about 450° C. U.S. Pat. No. 6,387,669 entitled "Methods for Producing Hydrogen (Bi)Sulfide and/or Removing Metals" describes a method of making hydrogen sulfide using anaerobic microorganisms known as sulfate-reducing bacteria (SRB) which couple the oxidation of an organic or hydrogen to the reduction of sulfate to hydrogen sulfide.

In mining, hydrogen sulfide is used in the preparation of metal sulfides and removal of impurities in metallurgical processes. This process is described, for example, in the article entitled "Biological Sulfide Production for Metal Recovery," by C. J. N. Buisman et al. at the TMS Congress of 1999. Often in industries (mining industries, sulfuric acid factories) diluted streams of sulfuric acid, contaminated with metals, have to be treated. Historically, these streams were neutralized using limestone or other alkalinic components, resulting in the precipitation of sulfates and metals such as gypsum and metal hydroxides, respectively, which have to be landfilled. The operating costs of this process are high while the operational costs associated with removal of sulfate and metals are relatively low (1500 mg/l for sulfate and 0.5-5 ppm for the metals). In addition, all valuable metals are lost in the sludge. Using biogenic sulfide production, these contaminated streams can be treated to produce sulfur and metal sulfides. Metals present in the waste acid bleed used as a source for hydrogen sulfide production will precipitate as metal sulfides according to:

$$\text{Metal} + H_2S \rightarrow \text{metal-sulfide} + H_2(g) \qquad (1)$$

Additionally metal oxides present in the waste id bleed used as a source for hydrogen sulfide production will precipitate as metal sulfides according to:

$$\text{Metal oxide} + H_2S \rightarrow \text{metal-sulfide} + H_2(O)l \qquad (2)$$

However obtained, hydrogen sulfide can be very costly to produce because of the dangers involved in production, and because of the hazards it poses to human health. What is needed is a cost effective method of producing industrial-scale quantities of hydrogen sulfide that eliminates the need for expensive reagents such as pure hydrogen, ethanol or natural gas. Additionally, it would be advantageous to produce hydrogen sulfide in a process that is thermodynamically favored such that the rate of production can be controlled by controlling the temperature of the reaction vessel.

DETAILED DESCRIPTION

The following description of the embodiments is merely exemplary in nature and is in no way intended to limit the subject matter of the present disclosure, their application, or uses.

As used throughout, ranges are used as shorthand for describing each and every value that is within the range. Any value within the range can be selected as the terminus of the range. Unless otherwise specified, all percentages and amounts expressed herein and elsewhere in the specification should be understood to refer to percentages by weight.

For the purposes of this specification and appended claims, unless otherwise indicated, all numbers expressing quantities, percentages or proportions, and other numerical values used in the specification and claims, are to be understood as being modified in all instances by the term "about." The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent, alternatively ±5 percent, and alternatively ±1 percent of the given numeric value provided such a deviation does not alter the end function or result of the value. Accordingly, unless indicated to the contrary, the numerical parameters set forth in this specification and attached claims are approximations that can vary depending upon the desired properties sought to be obtained by the present invention.

It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. For example, as used in this specification and the following claims, the terms "comprise" (as well as forms, derivatives, or variations thereof, such as "comprising" and "comprises"), "include" (as well as forms, derivatives, or variations thereof, such as "including" and "includes") and "has" (as well as forms, derivatives, or variations thereof, such as "having" and "have") are inclusive (i.e., open-ended) and do not exclude additional elements or steps. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

For the purposes of this specification and appended claims, the term "coupled" refers to the linking or connection of two objects. The coupling can be permanent or reversible. The coupling can be direct or indirect. An indirect coupling includes connecting two objects through one or more intermediary objects. The term "fluidically coupled" refers to the linking or connection of two objects which allows for the flow of a fluid (that is, a liquid, solution, or gas) between the two objects. The term "substantially" refers to an element essentially conforming to the particular dimension, shape or other word that substantially modifies, such that the component need not be exact. For example, substantially circular means that the object resembles a circle, but can have one or more deviations from a true circle.

The present invention is directed to methods of producing hydrogen sulfide in an alkaline environment. In methods disclosed herein, a mixture of a sodium salt and elemental sulfur (S) is added to a reactor for the purpose of generating hydrogen sulfide ($H_2S$) gas as the main product and sodium sulfate ($Na_2SO_4$) as a byproduct.

In some instances, the sodium salt can be sodium hydroxide (NaOH). $H_2S$ gas can be formed using NaOH as a starting material according to the following formula:

$$2NaOH(s)+4S(s)+2H_2O(l) \rightarrow Na_2SO_4(aq)+3H_2S(g) \qquad (3)$$

The thermodynamics of reaction (3) are given in Table 1 below:

TABLE 1

| T (° C.) | ΔH (kcal) | ΔS (cal/K) | ΔG (kcal) | K | Log(K) |
|---|---|---|---|---|---|
| 0.000 | −2.610 | 101.583 | −30.358 | 1.956E+024 | 24.291 |
| 50.000 | −7.029 | 85.872 | −34.778 | 3.333E+023 | 23.523 |
| 100.000 | −8.972 | 80.341 | −38.952 | 6.538E+022 | 22.815 |
| 150.000 | −15.055 | 65.000 | −42.560 | 9.620E+021 | 21.983 |
| 200.000 | −17.420 | 59.713 | −45.674 | 1.255E+021 | 21.099 |
| 250.000 | −17.241 | 59.909 | −48.582 | 1.983E+020 | 20.297 |
| 300.000 | −22.691 | 50.161 | −51.440 | 4.134E+019 | 19.616 |

As can be seen, based on the reaction stoichiometry, for every 2 mol of NaOH used, 3 mol of $H_2S$ and 1 mol of $Na_2SO_4$ is generated in a thermodynamically favored reaction (see Table 2 below).

TABLE 2

| Formula | Molecular Weight (g/mol) | Concentration (wt %) | Amount (mol) | Amount (g) | Volume (ml) |
|---|---|---|---|---|---|
| Reagents | | | | | |
| NaOH | 39.997 | 32.749 | 2.000 | 79.994 | 37.556 |
| S | 32.060 | 52.500 | 4.000 | 128.240 | 61.952 |
| $H_2O$ | 18.015 | 14.751 | 2.000 | 36.030 | 39.292 |
| Products | | | | | |
| $Na_2SO_4$ | 142.037 | 58.149 | 1.000 | 142.037 | 52.999 |
| $H_2S$ | 34.076 | 41.851 | 3.000 | 102.227 | 67.241 |

In some instances, the sodium salt can be sodium carbonate ($Na_2CO_3$). $H_2S$ gas can be formed using $Na_2CO_3$ as a starting material according to the following formula:

$$Na_2CO_3(s)+4S(s)+3H_2O(l) \rightarrow Na_2SO_4(aq)+3H_2S(g)+CO_2(g) \qquad (4)$$

In some instances, the sodium salt can be sodium hydrogen sulfide (NaHS). $H_2S$ gas can be formed using NaHS as a starting material according to the following formula:

$$2NaHS(s)+4S(s)+4H_2O(l) \rightarrow Na_2SO_4(aq)+5H_2S(g) \qquad (5)$$

In some instances, the sodium salt can be sodium sulfide ($Na_2S$). $H_2S$ gas can be formed using $Na_2S$ as a starting material according to the following formula:

$$Na_2S(s)+4S(s)+4H_2O(l) \rightarrow Na_2SO_4(aq)+4H_2S(g) \qquad (6)$$

In various methods for producing hydrogen sulfide, the operating conditions, such as the relative amount of starting materials (that is, sodium salt, $H_2O$, and elemental sulfur), the volume, the temperature and the pressure, can be changed. The reaction vessel can have a capacity ranging from, for example, about 100 ml to about 20 L, alternatively ranging from about 250 ml to about 10 L, alternatively ranging from about 500 ml to about 5 L, alternatively ranging from about 1 L to about 3 L. In some instances a 2 L capacity reaction vessel can be used. The temperature of the reaction vessel can be maintained at a temperature ranging from about 200° C. to about 300° C., alternatively about 210° C. to about 280° C., alternatively about 220° C. to about 260° C., and alternatively about 230° C. to about 240° C. The pressure of the reaction vessel can be maintained at a pressure ranging from about 500 psi to about 700 psi, alternatively from about 520 psi to about 680 psi, alternatively about 540 psi to about 660 psi, alternatively about 560 psi to about 640 psi, alternatively about 580 psi to about 620 psi, and alternatively about 600 psi.

Advantageously, the hydrogen required for the generation of $H_2S$ (g) is taken from $H_2O$ in the reaction vessel system, unlike other processes that have to feed expensive reagents such as pure hydrogen, ethanol or natural gas. The present invention discloses a novel method of producing hydrogen sulfide gas in a an alkaline process using only inexpensive reagents such as sodium hydroxide and elemental sulfur, keeping the overall cost of production low. Another major advantage of the claimed method is that the reaction rate can be controlled by varying the reactor temperature as described herein.

Figure 2:
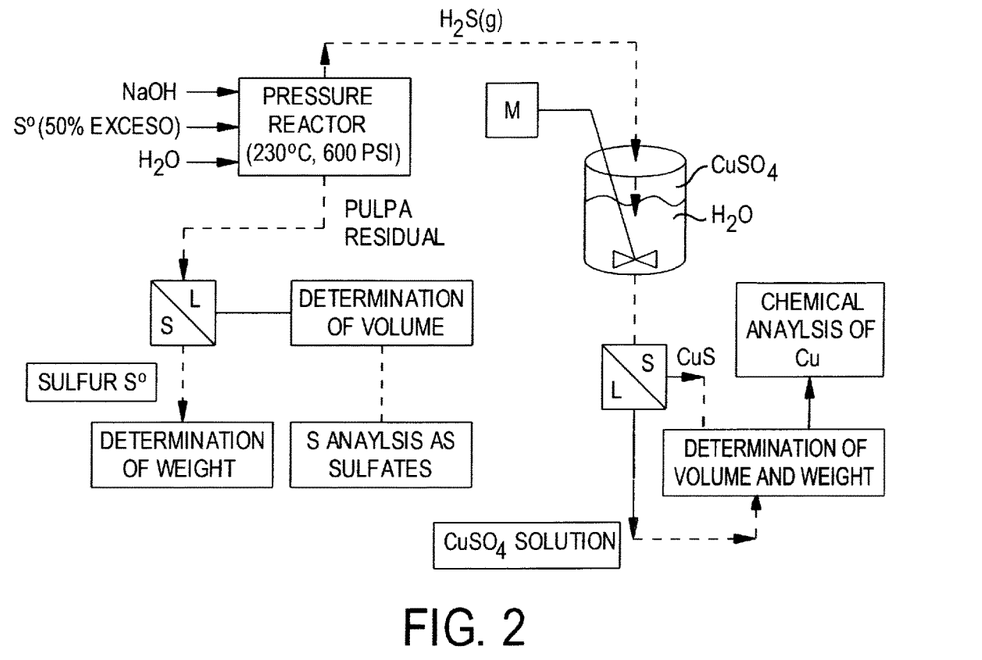
FIG. 2 is a diagram of an exemplary experimental design for testing and validation of a hydrogen sulfide generation process in accordance with various aspects of the present disclosure.

FIG. 2 is a diagram of an exemplary experimental design for testing and validation of a hydrogen sulfide generation process in accordance with various aspects of the present disclosure. In order to validate the proposed process by measuring the $H_2S$ (g) generated by the above reaction, the following materials and inputs can be used for testing and validation of the process and its mechanism:

1. A gas exhaust hood for the containment experiment;
2. A stainless steel pressure reactor (for example, an autoclave or high pressure reactor as manufactured by Parr Instrument Company) having, for example, a 2 L capacity, for reacting a predetermined mass of a sodium salt with a predetermined mass of elemental sulfur and a predetermined mass of water;
3. A glass reactor or beaker having, for example a 2-10 L capacity, and configured to accept the $H_2S(g)$ produced in the stainless steel pressure reactor;
4. A variable speed agitator or stirrer (M) for stirring contents contained within the glass reactor or beaker;
5. A predetermined mass of copper sulfate ($CuSO_4$) such as, for example, 1000 grams, dissolved in a predetermined amount of deionized (DI) water to form a $CuSO_4$ solution; the $CuSO_4$ solution being placed in the glass reactor or beaker. In some instances, the copper sulfate can be in the form of a hydrate such as, for example a pentahydrate ($CuSO_4.5H_2O$);
6. Hoses to connect the output of the pressure reactor with the glass reactor or beaker;
7. A filtration system to remove unreacted $CuSO_4$ solution; and
8. A sample drying oven for drying the formed CuS after removal of the unreacted $CuSO_4$ solution by the vacuum filtration system.

The produced $H_2S$ (g) can be removed from an outlet port located at a top or upper portion of the pressure reactor, which can then be reacted in the glass reactor containing the solution of copper sulfate ($CuSO_4$) forming CuS and $H_2SO_4$. In some instances the hose, which couples the outlet port of the pressure reactor with the glass reactor or beaker, can have an end which terminates at a top portion of the glass reactor or beaker and the $H_2S(g)$ can permeate into the $CuSO_4$ solution with the aid of agitation of stirring. In some instances the hose can have an end which is directly inserted into the $CuSO_4$ solution such that the $H_2S$ (g) can dissolve by bubbling into the $CuSO_4$ solution with or without the aid of agitation of stirring. The reaction occurs by contacting the $H_2S$ (g) and $CuSO_4$ is as follows:

$$CuSO_4(aq)+H_2S(g) \rightarrow CuS(s)+H_2SO_4(aq) \qquad (7)$$

When copper sulfate pentahydrate ($CuSO_4.5H_2O$) is used, the reaction occurs as follows:

$$CuSO_4.5H_2O+H_2S(g) \rightarrow CuS(s)+H_2SO_4(aq)+5H_2O(l) \qquad (8)$$

With this last part of the experiment, all the elements to validate the occurrence of the main reaction of hydrogen sulfide generation can be obtained by determination of the weight of the CuS formed and determination of the $CuSO_4$ remaining in solution.

FIG. 2 also illustrates an alternative or additional method for the testing and validation of a hydrogen sulfide generation process in accordance with various aspects of the present disclosure. In the alternative or additional method, the amount of sodium sulfate produced can be determined. For example, after completion of the $H_2S(g)$ forming reaction, the remaining reaction mixture located in the pressure reactor can be removed. Solids, such as for example, unreacted elemental sulfur, can be removed from the reaction mixture by a filtration system. The filtration system can be, for example, a vacuum filtration system comprising a porcelain buchner funnel with a filter material, a vacuum flask, and a vacuum pump. The remaining reaction mixture, now comprising an aqueous $Na_2SO_4$ solution, can be dried to remove the excess water, leaving unreacted sodium salt and the $Na_2SO_4$ byproduct. Subsequent analysis of sulfate content can be used, to indirectly determine the amount of formed H due to the known reaction stoichiometry.

Figure 3:
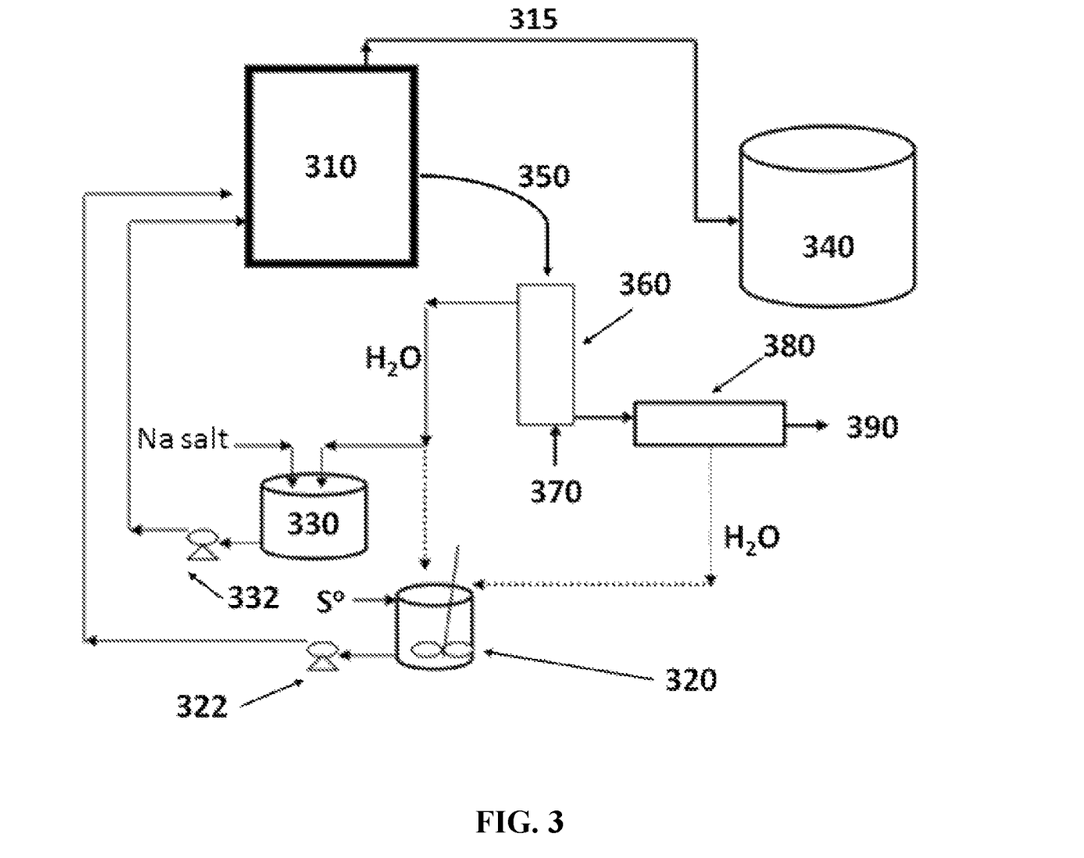
FIG. 3 is a block diagram of an exemplary hydrogen sulfide production system in accordance with various aspects of the present disclosure.

Referring now to FIG. 3, a block diagram shows the main components of an $H_2S$ formation system and process using a sodium salt as a reagent in accordance with various embodiments of the present disclosure, in addition to the main parameters to be controlled such as temperature, pressure, pH, concentration of reactants and $Na_2SO_4$ are also shown. To a reaction vessel 310, elemental sulfur dispersed in water via stirring can be transmitted from a sulfur feed source 320 via a pump 322 and an aqueous solution of sodium salt can be transmitted from a sodium salt feed source 330 via a pump 332. The sodium salt can be, for example, NaOH, $Na_2CO_3$, NaHS or $Na_2S$. The elemental sulfur dispersion and aqueous solution of sodium salt can be reacted in the reaction vessel 310 for a predetermined period of time (such as, for example, about 30 minutes). The temperature of the reaction vessel 310 can be maintained, using an internal or external heating element, at a temperature ranging from about room temperature to about 400° C., alternatively about room temperature to about 350° C., and alternatively from about room temperature to about 300° C. Internal heating elements, can be for example, coiled tubing or piping having heated fluids or gases circulated therethrough. External heating elements can be, for example, a hot plate, a heating mantle, a sand bath, an oil bath, and an external heat jacket. The pressure of the reaction vessel 310 can be maintained at a pressure ranging from about 500 psi to about 1500 psi, alternatively from about 600 psi to about 1400 psi, alternatively about 700 psi to about 1300 psi, alternatively about 800 psi to about 1200 psi, alternatively about 900 psi to about 1100 psi, and alternatively about 1000 psi. Contents within the reaction vessel 310 can be agitated or stirred. For example, in some instances, contents within the reaction vessel 310 can be stirred using a magnetic stir bar which is placed in the reaction vessel 310 and acted upon by, for example, a magnetic stirrer/hot plate. In some instances, the reaction vessel can have an impeller (such as a propeller or paddles) incorporated therein, which is actuated by a motor located externally from the reaction vessel. In other instances, agitation of the reaction can be accomplished using a shaker or sonicator coupled with an external surface of the reaction vessel.

Gaseous $H_2S$ produced in the reaction vessel 310 is emitted as a stream 315 and stored in a storage container 340. A solution containing $Na_2SO_4$ by-product produced in reactor 310 is emitted as a bleed stream 350 and optionally monitored by a pH meter (not shown) coupled therewith. The bleed stream 350 is coupled with a heat exchanger 360. A cold water source 370 is coupled with the heat exchanger 360. The produced $Na_2SO_4$ is transmitted from the bleed stream 350 to the heat exchanger 360 and is cooled in the heat exchanger 360. Water heated in the heat exchanger 360 can be recycled and transmitted to the sulfur feed source 320 and the sodium salt feed source 330. The cooled $Na_2SO_4$ is then transported to a crystallizer 380. Finally, crystallized $Na_2SO_4$ is transmitted from the crystallizer 380 to a storage 390 for disposal or further purification and sale.

Figure 4:
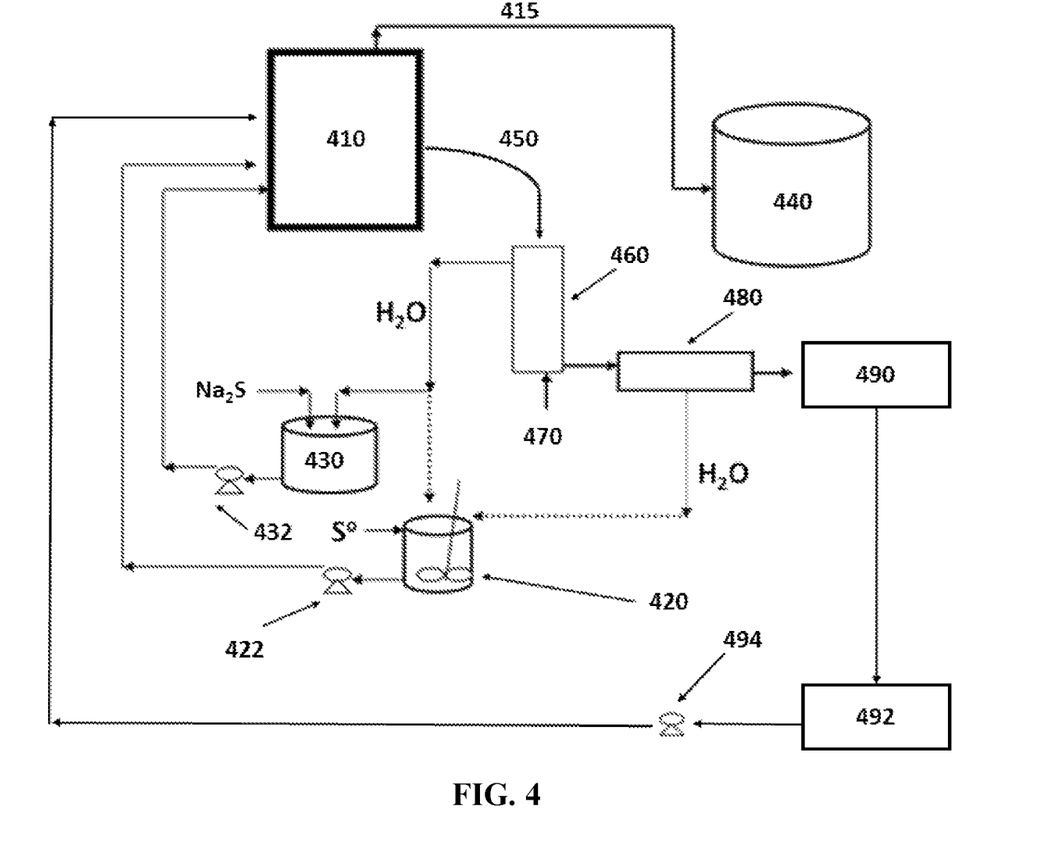
FIG. 4 is a block diagram of another exemplary hydrogen sulfide production system in accordance with various aspects of the present disclosure.

Referring now to FIG. 4, a block diagram shows the main components of an $H_2S$ formation system and process using $Na_2S$ as a reagent in accordance with various embodiments of the present disclosure, in addition to the main parameters to be controlled such as temperature, pressure, pH, concentration of reactants and $Na_2SO_4$ are also shown. To a reaction vessel 410, elemental sulfur dispersed in water via stirring can be transmitted from a sulfur feed source 420 via a pump 422 and an aqueous solution of $Na_2S$ can be transmitted from a $Na_2S$ feed source 430 via a pump 432. The elemental sulfur dispersion and aqueous solution of sodium salt can be reacted in the reaction vessel 410 for a predetermined period of time (such as, for example, about 30 minutes). The temperature of the reaction vessel 410 can be maintained, using an internal or external heating element, at a temperature ranging from about room temperature to about 400° C., alternatively about room temperature to about 350° C., and alternatively from about room temperature to about 300° C. Internal heating elements, can be for example, coiled tubing or piping having heated fluids or gases circulated therethrough. External heating elements can be, for example, a hot plate, a heating mantle, a sand bath, an oil bath, and an external heat jacket. The pressure of the reaction vessel 310 can be maintained at a pressure ranging from about 500 psi to about 1500 psi, alternatively from about 600 psi to about 1400 psi, alternatively about 700 psi to about 1300 psi, alternatively about 800 psi to about 1200 psi, alternatively about 900 psi to about 1100 psi, and alternatively about 1000 psi. Contents within the reaction vessel 410 can be agitated or stirred. For example, in some instances, contents within the reaction vessel 410 can be stirred using a magnetic stir bar which is placed in the reaction vessel 410 and acted upon by, for example, a magnetic stirrer/hot plate. In some instances, the reaction vessel 410 can have an impeller (such as a propeller or paddles) incorporated therein, which is actuated by a motor located externally from the reaction vessel 410. In other instances, agitation of the reaction can be accomplished using a shaker or sonicator coupled with an external surface of the reaction vessel 410.

Gaseous $H_2S$ produced in the reaction vessel 410 is emitted as a stream 415 and stored in a storage container 440. A solution containing $Na_2SO_4$ by-product produced in reactor 410 is emitted as a bleed stream 450 and optionally monitored by pH meter no shown) coupled therewith. The bleed stream 450 is coupled with a heat exchanger 460. A cold water source 470 is coupled with the heat exchanger 460. The produced $Na_2SO_4$ is transmitted from the bleed stream 450 to the heat exchanger 460 and is cooled in the heat exchanger 460. Water heated in the heat exchanger 460 can be recycled and transmitted to the sulfur feed source 420 and the $Na_2S$ feed source 430. The cooled $Na_2SO_4$ is then transported to a crystallizer 480. Finally, crystallized $Na_2SO_4$ is transmitted from the crystallizer 480 to a $Na_2SO_4$ reduction system 490. The reduction system 490 converts the crystallized $Na_2SO_4$ to liquid $Na_2S$ and produces $CO_2$ as a by-product. In souse instances, the reduction system 490 can be for example a carbothermal reduction system such as described in U.S. Pat. No. 4,198,385, the contents of which are incorporated by reference herein in its entirety. The liquid $Na_2S$ is then transmitted to a vessel 492 wherein an aqueous $Na_2S$ solution can be formed via the introduction of water. The vessel 492 can be fluidically coupled with the reduction system 490. The vessel 492 can be substantially similar to the feed source 430. The water can be provided to the vessel 492 from the heat exchanger 460, the cold water source 470, the crystallizer 480, or a different water source. The aqueous $Na_2S$ solution can then be transmitted to the reaction vessel 410 via a pump 494. The system of FIG. 4 therefore allows for the conversion of $Na_2SO_4$ by-product to $Na_2S$, one of the reagents used in the $H_2S$ formation.

In some instances, a sodium salt other than $Na_2S$ can be used in the system and process of FIG. 4. For example, in some instances, an aqueous solution of NaOH, NaOH or $Na_2CO_3$ can be transmitted from the feed source 430 to the reaction vessel 410 at the beginning of the process. Then, as the $Na_2SO_4$ by-product is formed and reduced to $Na_2S$ in the reduction system 490, the process can be continued using $Na_2S$ rather than by the provision of additional NaOH, NaHS or $Na_2CO_3$.

Figure 5:
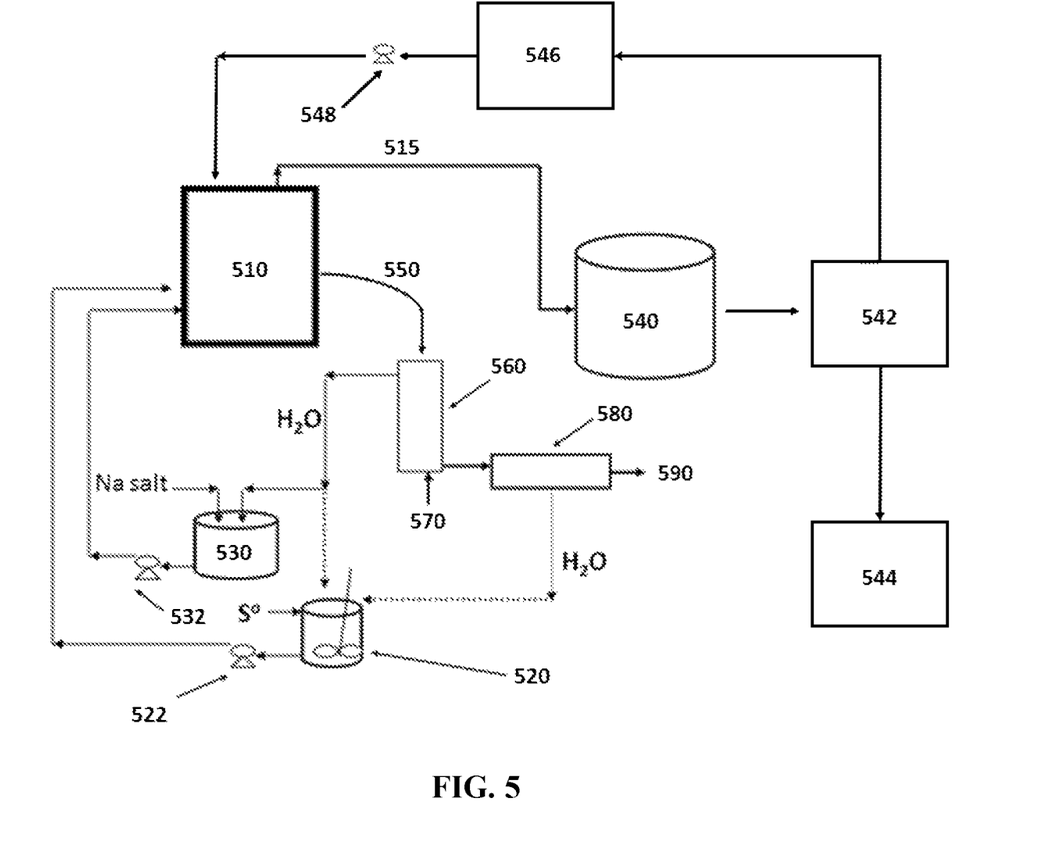
FIG. 5 is a block diagram of yet another exemplary hydrogen sulfide production system in accordance with various aspects of the present disclosure.

Referring now to FIG. 5, a block diagram shows the main components of an I-12S and hydrogen gas, $H_2(g)$, formation system and process using a sodium salt as a reagent in accordance with various embodiments of the present disclosure, in addition to the main parameters to be controlled such as temperature, pressure, pH, concentration of reactants and $Na_2SO_4$ are also shown. To a reaction vessel 510, elemental sulfur dispersed in water via stirring can be transmitted from a sulfur feed source 520 via a pump 522 and an aqueous solution of sodium salt can be transmitted from a sodium salt feed source 530 via a pump 532. The sodium salt can be, for example, NaOH, $Na_2CO_3$, NaHS or $Na_2S$. The elemental sulfur dispersion and aqueous solution of sodium salt can be reacted in the reaction vessel 510 for a predetermined period of time (such as, for example, about 30 minutes). The temperature of the reaction vessel 510 can be maintained, using an internal or external heating element, at a temperature ranging from about room temperature to about 400° C., alternatively about room temperature to about 350° C., and alternatively from about room temperature to about 300° C. Internal heating elements, can be for example, coiled tubing or piping having heated fluids or gases circulated therethrough. External heating elements can be, for example, a hot plate, a heating mantle, a sand bath, an oil bath, and an external heat jacket. The pressure of the reaction vessel 510 can be maintained at a pressure ranging from about 500 psi to about 1500 psi, alternatively from about 600 psi to about 1400 psi, alternatively about 700 psi to about 1300 psi, alternatively about 800 psi to about 1200 psi, alternatively about 900 psi to about 1100 psi, and alternatively about 1000 psi. Contents within the reaction vessel 510 can be agitated or stirred. For example, in some instances, contents within the reaction vessel 510 can be stirred using a magnetic stir bar which is placed in the reaction vessel 510 and acted upon by, for example, a magnetic stirrer/hot plate. In some instances, the reaction vessel 510 can have an impeller (such as a propeller or paddles) incorporated therein, which is actuated by a motor located externally from the reaction vessel 510. In other instances, agitation of the reaction can be accomplished using a shaker or sonicator coupled with an external surface of the reaction vessel 510.

Gaseous $H_2S$ produced in the reaction vessel 510 is emitted as a stream 515 and stored in a high pressure storage container 540. A solution containing $Na_2SO_4$ by-product produced in reactor 510 is emitted as a bleed stream 550 and optionally monitored by a pH meter (not shown) coupled therewith. The bleed stream 550 is coupled with a heat exchanger 560. A cold water source 570 is coupled with the heat exchanger 560. The produced Na$_2$SO$_4$ is transmitted from the bleed stream 550 to the heat exchanger 560 and is cooled in the heat exchanger 560. Water heated in the heat exchanger 560 can be recycled and transmitted to the sulfur feed source 520 and the sodium salt feed source 530. The cooled Na$_2$SO$_4$ is then transported to a crystallizer 580. Finally, crystallized Na$_2$SO$_4$ is transmitted from the crystallizer 580 to a storage 590 for disposal or further purification and sale.

The H$_2$S can subsequently be transmitted from the high pressure storage container 540 to an H$_2$S decomposition reactor 542 via a fluidic coupling. In the decomposition reactor 542, the H$_2$S is converted to elemental sulfur and H$_2$(g). The decomposition reactor can be for example a superadiabatic H$_2$S decomposition reactor as described in "Production of Hydrogen by Superadiabatic Decomposition of Hydrogen Sulfide," by Rachid B. Slimane et al. (Proceedings of the 2002 U.S. DOE Hydrogen Program Review, NREL/CP-610-32405). The H$_2$(g) can be transmitted to a high pressure storage container 544. The elemental sulfur can then transmitted to a vessel 546 wherein the elemental sulfur dispersed in water via stirring to form an aqueous sulfur solution. The water can be provided to the vessel 546 from the heat exchanger 560, the cold water source 570, the crystallizer 580, or a different water source. The vessel 546 can be substantially similar to the sulfur feed source 520. The aqueous sulfur solution can then be transmitted to the reaction vessel 510 via a pump 548 for continued H$_2$S formation.

In some instances, elements of the system of FIG. 4 and elements of the system of FIG. 5 can be combined to yield a system having both a Na$_2$SO$_4$ reduction system and a H$_2$S decomposition reactor.

In any of the above embodiments, elemental sulfur can be used in excess to ensure complete conversion of the sodium salt during H$_2$S synthesis.

The productivity of H$_2$S forming processes can be calculated based on the consumption of the main reagent (NaOH, Na$_2$CO$_3$ or Na$_2$S) and S. This information on the productivity of the different variants is summarized in Table 3.

TABLE 3

Productivity of the different variants in the generation process of H$_2$S.

| Principal Reagent | Tons of H$_2$S Generated/Ton of Principal Reagent Used | Tons of H$_2$S Generated/Ton S Used |
|---|---|---|
| NaOH | 1.276 | 0.797 |
| Na$_2$CO$_3$ | 0.962 | 0.797 |
| Na$_2$S | 1.74 | 1.063 |

A summary of requirements for the reagents per test performed according to the variant of H$_2$S generation process used is summarized in Table 4.

TABLE 4

Reagent requirement by experimental procedure performed depending on the variant used for the production of H$_2$S.

| Principal Reagent | Principal Reagent (grams) Consumption for each experiment | S (grams) Consumption per experiment | H$_2$O (grams) Consumption used in each experiment |
|---|---|---|---|
| NaOH | 160 | 320 | 72 |
| Na$_2$CO$_3$ | 212 | 320 | 108 |
| Na$_2$S | 156 | 320 | 144 |

Statements of the Disclosure Include:

Statement 1: A method for producing hydrogen sulfide gas, the method comprising placing elemental sulfur and a sodium salt solution comprising sodium salt in water in a reaction vessel; and reacting the elemental sulfur with the sodium salt solution to form hydrogen sulfide (H$_2$S) and sodium sulfate (Na$_2$SO$_4$).

Statement 2: A method according to Statement 1, wherein the reaction vessel is configured to be pressurized to a pressure ranging from about 500 pounds per square inch (psi) to about 700 psi and heated to a temperature ranging from about 200° C. to about 300° C.

Statement 3: A method according to Statement 1 or Statement 2, further comprising pressuring the reaction vessel to a pressure of about 600 psi.

Statement 4: A method according to any one of Statements 1-3, further comprising heating the reaction vessel to a temperature ranging from about 230° C. to about 240° C.

Statement 5: A method according to any one of Statements 1-4, further comprising agitating the elemental sulfur and the sodium hydroxide solution in the reaction vessel.

Statement 6: A method according to any one of Statements 1-5, further comprising removing the formed sodium sulfate from the reaction vessel; and crystallizing the sodium sulfate using a crystallizer.

Statement 7: A method according to Statement 6, further comprising reducing the crystallized sodium sulfate to produce Na$_2$S; forming a Na$_2$S solution with the produced Na$_2$S; placing elemental sulfur and the Na$_2$S solution in the reaction vessel; and reacting the elemental sulfur with the Na$_2$S solution to form hydrogen sulfide and sodium sulfate.

Statement 8: A method according to any one of Statements 1-7, further comprising reacting the formed hydrogen sulfide with an aqueous copper sulfate solution to form CuS for determining the effective yield of H$_2$S.

Statement 9: A method according to any one of Statements 1-8, wherein the sodium salt is any one of sodium hydroxide (NaOH), sodium carbonate (Na$_2$CO$_3$), sodium hydrogen sulfide (NaHS), and sodium sulfide (Na$_2$S).

Statement 10: A method according to Statement 9, wherein the sodium salt is NaOH.

Statement 11: A method according to Statement 9, wherein the sodium salt is Na$_2$S.

Statement 12: A method according to Statement 11, further comprising removing the formed sodium sulfate from the reaction vessel; crystallizing the sodium sulfate using a crystallizer; reducing the crystallized sodium sulfate to form Na$_2$S; forming a Na$_2$S solution with the formed Na$_2$S; placing elemental sulfur and the Na$_2$S solution in the reaction vessel; and reacting the elemental sulfur with the Na$_2$S solution to form hydrogen sulfide (H$_2$S) and sodium sulfate (Na$_2$SO$_4$).

Statement 13: A method according to any one Statements 1-12, further comprising decomposing the hydrogen sulfide to produce hydrogen and elemental sulfur; placing the produced elemental sulfur and a sodium salt solution comprising a sodium salt in water in the reaction vessel; and reacting the produced elemental sulfur with the sodium salt solution to form hydrogen sulfide (H$_2$S) and sodium sulfate (Na$_2$SO$_4$).

Statement 14: A system for producing gaseous hydrogen sulfide (H$_2$S) gas and sodium sulfate (Na$_2$SO$_4$), the system comprising a reaction vessel; a sulfur feed source fluidically coupled with the reaction vessel; a sodium salt solution feed source fluidically coupled with the reaction vessel; and a storage container fluidically coupled with the reaction vessel for storage of produced H$_2$S gas.

Statement 15: A system according to Statement 14, wherein the reaction vessel is configured to be pressurized to a pressure ranging from about 500 pounds per square inch (psi) to about 700 psi and heated to a temperature ranging from about 200° C. to about 300° C.

Statement 16: A system according to Statement 14 or Statement 15, wherein the reaction vessel is heated by an internal heating element.

Statement 17: A system according to Statement 14 or Statement 15, wherein the reaction vessel is heated by an external heating element.

Statement 18: A system according to any one of Statements 14-17, wherein the reaction vessel is configured for agitation or stiffing of the contents within the reaction vessel.

Statement 19: A system according to any one of Statements 14-18, further comprising a heat exchanger fluidically coupled with the reaction vessel for cooling a solution containing the $Na_2SO_4$ produced in the reaction vessel.

Statement 20: A system according to Statement 19, further comprising a crystallizer fluidically coupled with the heat exchanger for crystallizing the sodium sulfate.

Statement 21: A system according to Statement 20, further comprising a $Na_2SO_4$ reduction system for reducing the crystallized $Na_2SO_4$ to form liquid $Na_2S$.

Statement 22: A system according to Statement 21, further comprising a container fluidically coupled with the reduction system for forming an aqueous $Na_2S$ solution, the container also being fluidically coupled with the reaction vessel.

Statement 23: A system according to any one of Statements 14-22, further comprising a first pump between the sulfur feed source and the reaction vessel; and a second pump between the sodium hydroxide solution feed source and the reaction vessel.

Statement 24: A system according to any one of Statements 14-23, further comprising an $H_2S$ decomposition reactor fluidically coupled with the storage container for decomposing the $H_2S$ to produce hydrogen and elemental sulfur.

Statement 25: A system according to Statement 24, further comprising a hydrogen storage container fluidically coupled with the decomposition reactor for storing the produced hydrogen; and a sulfur storage container coupled with the decomposition reactor for storing of the produced elemental sulfur and producing an aqueous sulfur solution therein.

Statement 26: A system according to Statement 25, wherein the sulfur storage container is fluidically coupled with the reaction vessel.

Statement 27: A system according to any one of Statements 14-26, wherein the sodium salt is any one of sodium hydroxide (NaOH), sodium carbonate ($Na_2CO_3$), sodium hydrogen sulfide (NaHS), and sodium sulfide ($Na_2S$).

Statement 28: A system according to Statement 27, wherein the sodium salt is NaOH.

Statement 29: A system according to Statement 27, wherein the sodium salt is $Na_2S$.

EXAMPLES

Example 1

In a 1-liter reaction vessel, 128 grams of elemental sulfur and a solution comprising 80 grams of NaOH and 650 grams of $H_2O$ were added. The reaction vessel was heated to a temperature of about 240° C. and pressurized to about 600 psi. The reaction was agitated for 2 minutes. After the 2 minute agitation period, the amount of $H_2S(g)$ produced was determined using a $CuSO_4$ solution as described in FIG. 2. The above was repeated for periods of 4, 6, 8, 10, 15, 20, 25 and 30 minutes. The amount of $H_2S(g)$ produced over the above time periods is shown in Table 5 below.

TABLE 5

| Time (min) | $H_2S$ produced (grams) |
|---|---|
| 0 | 0.00 |
| 2 | 0.34 |
| 4 | 1.57 |
| 6 | 5.16 |
| 8 | 6.76 |
| 10 | 7.94 |
| 15 | 17.46 |
| 20 | 27.28 |
| 25 | 33.79 |
| 30 | 41.93 |

Example 2

In a 1-liter reaction vessel, 192 grams of elemental sulfur and a solution comprising 120 grams of NaOH and 500 grams of $H_2O$ were added. The reaction vessel was heated to a temperature of about 240° C. and pressurized about 600 psi. The reaction was agitated for 2 minutes. After the 2 minute agitation period, the amount of $H_2S(g)$ produced was determined using a $CuSO_4$ solution as described in FIG. 2. The above was repeated for periods of 4, 6, 8, 10, 15, 20, 25 and 30 minutes. The amount of $H_2S(g)$ produced over the above time periods is shown in Table 6 below.

TABLE 6

| Time (min) | $H_2S$ produced (grams) |
|---|---|
| 0 | 0.00 |
| 2 | 3.78 |
| 4 | 5.20 |
| 6 | 10.29 |
| 8 | 15.20 |
| 10 | 22.90 |
| 15 | 44.61 |
| 20 | 65.51 |
| 25 | 84.10 |
| 30 | 92.69 |

Example 3

In a 1-liter reaction vessel, 160 grams of elemental sulfur and a solution comprising 256 grams of NaOH and 500 grams of $H_2O$ were added. The reaction vessel was heated to a temperature of about 240° C. and pressurized to about 600 psi. The reaction was agitated for 2 minutes. After the 2 minute agitation period, the amount of $H_2S(g)$ produced was determined using a $CuSO_4$ solution as described in FIG. 2. The above was repeated for periods of 4, 6, 8, 10, 15, 20, 25 and 30 minutes. The amount of $H_2S(g)$ produced over the above time periods is shown in Table 7 below.

TABLE 7

| Time (min) | $H_2S$ produced (grams) |
|---|---|
| 0 | 0.00 |
| 2 | 3.78 |

TABLE 7-continued

| Time (min) | $H_2S$ produced (grams) |
|---|---|
| 4 | 5.20 |
| 6 | 10.29 |
| 8 | 15.20 |
| 10 | 22.90 |
| 15 | 44.61 |
| 20 | 65.51 |
| 25 | 84.10 |
| 30 | 92.69 |

Figure 6:
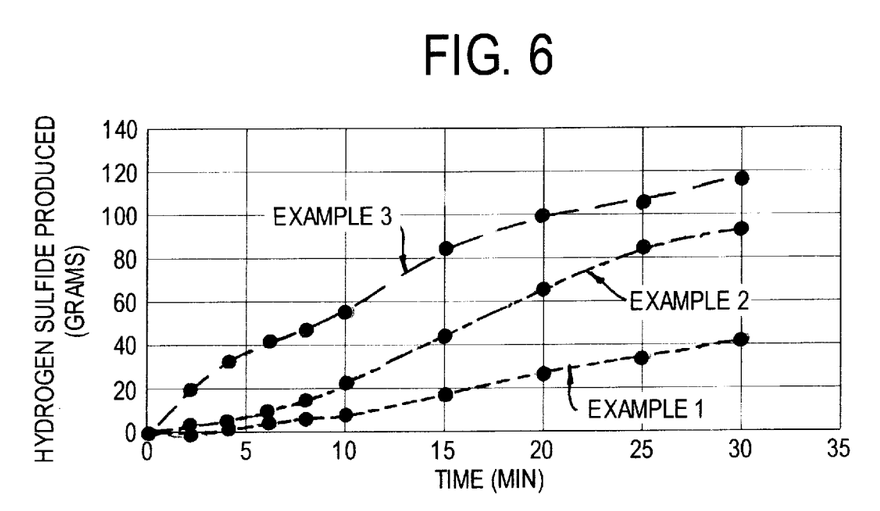
FIG. 6 is a graphical display of hydrogen sulfide production over time using varying amounts of sodium hydroxide (NaOH) and elemental sulfur (S).

FIG. 6 is a graphical display of hydrogen sulfide production over time using varying amounts of sodium hydroxide (NaOH) and elemental sulfur (S). The bottom line corresponds to data obtained in Example 1, the middle line corresponds to data obtained in Example 2, and the top line corresponds to data obtained in Example 3. From the above data above, it can be concluded that approximately 232 grams of $H_2S(g)$ can be produced every hour in a 1-liter reaction vessel using the methods of the present disclosure, which equals 5.568 kg of $H_2S(g)$ per day. A scaled up reaction using methods of the present disclosure, using a 1000 liter vessel, can produce over 6 tons of $H_2S(g)$ per day.

Although the present invention and its objects, features and advantages have been described in detail, other embodiments are encompassed by the invention. Finally, those skilled in the art should appreciate that they can readily use the disclosed conception and specific embodiments as a basis for designing or modifying other structures for carrying out the same purposes of the present invention without departing from the scope of the invention as defined by the appended claims.

What is claimed is:

1. A method for producing hydrogen sulfide ($H_2S$) gas, the method comprising:
    placing elemental sulfur and a sodium salt solution comprising a sodium salt in water in a reaction vessel; and
    reacting the elemental sulfur with the sodium salt solution to form hydrogen sulfide ($H_2S$) and sodium sulfate ($Na_2SO_4$).

2. The method of claim 1, wherein the reaction vessel is configured to be pressurized to a pressure ranging from about 500 pounds per square inch (psi) to about 700 psi and heated to a temperature ranging from about 200° C. to about 300° C.

3. The method of claim 1, further comprising pressuring the reaction vessel to a pressure of about 600 psi.

4. The method of claim 1, further comprising heating the reaction vessel to a temperature ranging from about 230° C. to about 240° C.

5. The method of claim 1, further comprising agitating the elemental sulfur and the sodium salt solution in the reaction vessel.

6. The method of claim 1, further comprising:
    removing the formed sodium sulfate from the reaction vessel; and
    crystallizing the sodium sulfate using a crystallizer.

7. The method of claim 6, further comprising:
    reducing the crystallized sodium sulfate to produce $Na_2S$;
    forming a $Na_2S$ solution with the produced $Na_2S$;
    placing elemental sulfur and the $Na_2S$ solution in the reaction vessel; and
    reacting the elemental sulfur with the $Na_2S$ solution to form hydrogen sulfide and sodium sulfate.

8. The method of claim 1, further comprising reacting the formed hydrogen sulfide with an aqueous copper sulfate solution to form CuS for determining the effective yield of $H_2S$.

9. The method of claim 1, wherein the sodium salt is any one of sodium hydroxide (NaOH), sodium carbonate ($Na_2CO_3$), sodium hydrogen sulfide (NaHS), and sodium sulfide ($Na_2S$).

10. The method of claim 9, wherein the sodium salt is NaOH.

11. The method of claim 9, wherein the sodium salt is $Na_2S$.

12. The method of claim 11, further comprising:
    removing the formed sodium sulfate from the reaction vessel;
    crystallizing the sodium sulfate using a crystallizer;
    reducing the crystallized sodium sulfate to form $Na_2S$;
    forming a $Na_2S$ solution with the formed $Na_2S$;
    placing elemental sulfur and the $Na_2S$ solution in the reaction vessel; and
    reacting the elemental sulfur with the $Na_2S$ solution to form hydrogen sulfide and sodium sulfate.

13. The method of claim 1, further comprising:
    decomposing the hydrogen sulfide to produce hydrogen and elemental sulfur;
    placing the produced elemental sulfur and a sodium salt solution comprising a sodium salt in water in the reaction vessel; and
    reacting the produced elemental sulfur with the sodium salt solution to form hydrogen sulfide ($H_2S$) and sodium sulfate ($Na_2SO_4$).

14. A system for producing hydrogen sulfide ($H_2S$) gas and sodium sulfate ($Na_2SO_4$), the system comprising:
    a reaction vessel;
    a sulfur feed source fluidically coupled with the reaction vessel;
    a sodium salt solution feed source fluidically coupled with the reaction vessel; and
    a storage container fluidically coupled with the reaction vessel for storage of produced $H_2S$ gas.

15. The system of claim 14, wherein the reaction vessel is configured to be pressurized to a pressure ranging from about 500 pounds per square inch (psi) to about 700 psi and heated to a temperature ranging from about 200° C. to about 300° C.

16. The system of claim 14, wherein the reaction vessel is heated by an internal heating element.

17. The system of claim 14, wherein the reaction vessel is heated by an external heating element.

18. The system of claim 14, wherein the reaction vessel is configured for agitation or stirring of the contents within the reaction vessel.

19. The system of claim 14, further comprising a heat exchanger fluidically coupled with the reaction vessel for cooling a solution containing the $Na_2SO_4$ produced in the reaction vessel.

20. The system of claim 19, further comprising a crystallizer fluidically coupled with the heat exchanger for crystallizing the $Na_2SO_4$.

21. The system of claim 20, further comprising:
    a $Na_2SO_4$ reduction system for reducing the crystallized $Na_2SO_4$ to form liquid $Na_2S$.

22. The system of claim 21, further comprising:
    a container fluidically coupled with the reduction system for forming an aqueous $Na_2S$ solution, the container also being fluidically coupled with the reaction vessel.

23. The system of claim 14, further comprising:
- a first pump between the sulfur feed source and the reaction vessel; and
- a second pump between the sodium salt solution feed source and the reaction vessel.

24. The system of claim 14, further comprising an $H_2S$ decomposition reactor fluidically coupled with the storage container for decomposing the $H_2S$ to produce hydrogen and elemental sulfur.

25. The system of claim 24, further comprising:
- a hydrogen storage container fluidically coupled with the decomposition reactor for storing the produced hydrogen; and
- a sulfur storage container coupled with decomposition reactor for storing of the produced elemental sulfur and producing an aqueous sulfur solution therein.

26. The system of claim 25, wherein the sulfur storage container is fluidically coupled with the reaction vessel.

* * * * *